Feb. 13, 1923.
1,445,144

J. F. KOHLER

PARING MACHINE

Filed Apr. 21, 1921    5 sheets-sheet 3

John F. Kohler, Inventor
By his Attorney
Charles G. Hensley

Feb. 13, 1923.  1,445,144
J. F. KOHLER
PARING MACHINE
Filed Apr. 21, 1921.  5 sheets-sheet 4

Feb. 13, 1923.

J. F. KOHLER

PARING MACHINE

Filed Apr. 21, 1921

John F. Kohler, Inventor
By his Attorney
Charles G. Hensley

Patented Feb. 13, 1923.

1,445,144

UNITED STATES PATENT OFFICE.

JOHN F. KOHLER, OF LARCHMONT, NEW YORK.

PARING MACHINE.

Application filed April 21, 1921. Serial No. 463,434.

*To all whom it may concern:*

Be it known that I, JOHN F. KOHLER, a citizen of the United States, and a resident of Larchmont, in the county of Westchester and State of New York, have invented certain new and useful Improvements in Paring Machines, of which the following is a specification.

My invention relates to machines for paring edible products. I have adapted it to the paring of cocoanuts and I have shown it embodied in a structure more especially adapted for that purpose although it will be apparent that my invention is not limited to this particular use. In the paring of cocoanuts it is desirable that the thin brown skin be removed over every part of the cocoanut and with as little waste of meat as possible. The cocoanuts vary greatly in both size and shape and it has been difficult to remove every part of the brown skin without repeating the cutting operation over over some portions of the cocoanut and thereby removing portions of the meat wastefully. It is difficult to provide means for holding the cocoanut so that all parts of it may be pared and therefore it has been proposed to pare one half the cocoanut in a machine and to then replace the half pared nut in the same or another machine, reversed, to pare the other half of the nut, but it is difficult to handle the half pared nuts. The object of the present invention is to provide a machine which will grip and hold the nut with at least one half thereof exposed to the action of a paring knife for paring one half the nut and which will automatically transfer the half pared nut to a second holder which will hold the nut with its unpared half exposed to the action of a paring knife. It is only necessary for the operator to place the nut in the first holder and from then until the nut is entirely pared the machine operates automatically.

In the preferred construction both halves of the nut are pared starting from the equator and ending at one of the poles of the nut as this makes it possible to pare all portions of the nut and to pare nuts of varying sizes and shapes without repeating the cutting action over any part of the nut and thus wasting the meat.

In the preferred embodiment of my invention the nut holding devices are carried on revolving turrets, the turrets being so positioned that the holders on both turrets align at one point in the revolution of the turrets and when thus aligned the holders transfer the nut, endwise, from one holder to the other without freeing the nut.

Another object of my invention is to provide a machine which will pare the nuts as rapidly as the operator can properly feed them to the machine. For this purpose the machine is so constructed that several different functions are carried out simultaneously. For instance, the operator feeds a nut to one of the holders while one of the turrets is in position with one of its nut holding devices prepared to receive the nut and while the operator is engaged in placing the nut in the holder a previously fed nut is being pared on its first half portion. At the same time a previously half pared nut is being transferred from the first to the second turret. On the second turret, and during the above described period, one holder is receiving the half pared nut from the first turret, another nut held in the second turret is being pared over its second half and another nut is being discharged from the second turret. Each of these individual functions can be performed in about the length of time required for the operator to feed a nut into one of the holders and by overlapping the functions or by simultaneously performing the several functions referred to the machine is made to pare the nuts as fast as the operator can properly feed them into the machine. Otherwise, a lapse of time would have to be allowed between the feeding operations for the functions to be carried out by the machine and the output would be very limited.

Various other advantageous will be apparent from the following detailed description of my invention.

In the drawing forming part of this application.

I prefer to make one of the turrets shiftable axially toward and from the other turret in order that the turrets may be brought close together for the transfer of the nut from one turret to the other and in order that the turrets may be separated to permit them to revolve without interfering and without interference between the several nuts carried by them. While either or both turrets may be made to shift I have chosen to illustrate my invention embodied in a machine wherein the second turret is shifted axially and wherein the first turret merely revolves. In many respects the turrets are alike so that much of the description will apply to both turrets alike. I shall refer to them as the first and second turrets to distinguish them, and the first is the one which receives the nuts originally while the second turret receives the half pared nuts from the first turret.

The machine embodies a suitable frame 3 for supporting the various working parts of the machine. The turret 1 is mounted at one side of the frame while the second turret 2 is mounted on a movable carriage 4 which travels on the tracks or rods 5 in a direction toward and from the first or stationary turret. There is a cam 6 on the shaft 7 and this actuates a roller 8 on a bar 9 sliding in the bearings 10; and this bar reciprocates the carriage 4 to move the second turret toward and from the first turret each time the turrets are partially revolved, for a purpose which will appear hereinafter.

Figure 4:
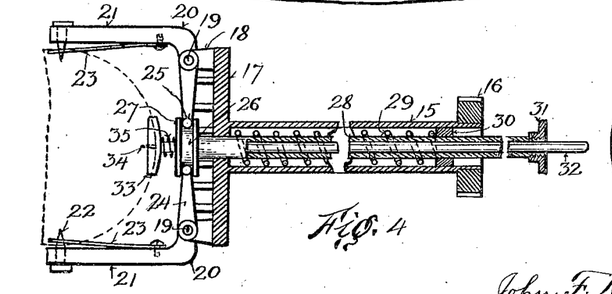
Figure 4 is a sectional view of one of the chucks for holding a nut.
Figure 5:
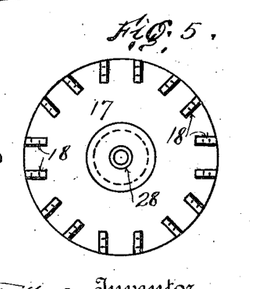
Figure 5 is an end view of the head of one of the chucks.
Figures 6, 7, 8, 9, 10:
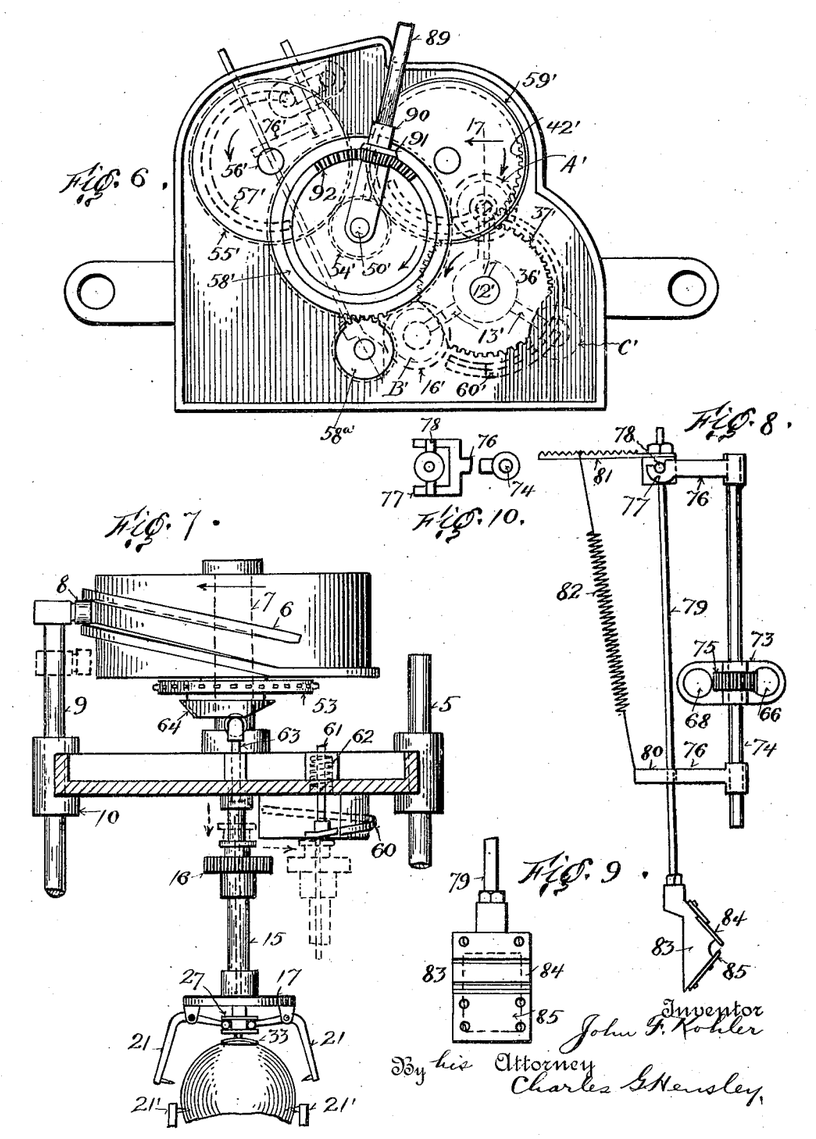
Figure 6 is an end view of the mechanism for operating the movable parts on the axially shiftable turret.
Figure 7 is a sectional diagrammatic view illustrating the means for shifting one of the turrets axially.
Figure 8 is a detail end view of one of the paring devices.
Figures 9 and 10 are detail views of parts thereof.

The first turret is constructed and operated as follows:

The turret comprises in part a hub 11 which revolves on a shaft 12, being fixed to the latter, and from this hub extend three pairs of arms 13, the arms of each pair being parallel and provided on their outer ends with bearings 14 in which are journaled the sleeves 15 of the several chucks. The pairs of arms 13 are preferably arranged radially of the hub 11, 120° apart so that there will be three chucks on the turret and as the turret turns one third of a revolution at each operation these several pairs of arms and chucks successively stop at similar positions. Each pair of arms 13 carries a chuck for holding and revolving a cocoanut or other article to be acted upon, and in Figures 4 and 5 I have shown in detail the construction of one of these chucks. All the chucks on both turrets may be constructed the same so that the description here may apply to all chucks.

There is a sleeve 15 which revolves in the bearings 14 on the outer ends of a pair of the arms 13 and at one end this sleeve is provided with a fixed gear 16 through which the chuck is revolved as will appear hereinafter. At the other end of this sleeve there is a head 17 provided with a number of pairs of upstanding ears 18 arranged in a circle around the head. In each pair of ears there is a pin 19 on which bell crank levers 20 are fulcrumed, and these levers constitute the nut holding members of the chuck. The levers 20 each have an arm 21 projecting away from the head 17 and provided on its free end with a pin 22 for piercing the cocoanut sufficiently to secure a non-slipping hold without extending all the way through the meat of the nut as that would release the liquor or milk. Each pin 22 projects through the free end of an ejector spring 23 mounted on the arm 21. When the pins 22 pierce the cocoanut the springs 23, engaging the outside of the nut, are retracted and when the arms 21 are swung out to release the nut these springs serve to strip or push the cocoanut off the pins 22 to release the nut from the chuck. The other arms 24 of the levers 20 have heads 25 which engage in the grooves 26 of a member 27 carried on an inner sleeve 28 which reciprocates inside the sleeve 15. There is a coiled spring 29 surrounding the sleeve 28 and lying within the sleeve 15, and it is compressed between the head 17 and a collar 30 fixed to the sleeve 28. The purpose of this spring is to normally force the sleeve 28 to the right in Figure 4 and this tends to move the arms 24 to the right in this figure and consequently the arms 21 are moved radially inwardly toward the axis of the chuck to grip the cocoanut between the several arms 21 for the purpose of holding and revolving it. The sleeve 28 has a head 31 on its free end which is acted upon by a cam to move the sleeve 28 to the left in Figure 4, as will appear hereinafter, and this action opens the several arms 21 to release the cocoanut. There is a spindle 32 passing through the sleeve 28, one end of which projects beyond the head 31 of the sleeve 28 to be acted upon in a manner subsequently described. The other end of this spindle carries a center plate 33 having a concave recess to receive one of the poles of the nut and having a pin 34 to partially pierce the nut. This plate 33, co-operates with the arms 21 to hold the nut in position in the chuck and it may be forced inwardly more or less against the action of the compression spring 35, when the nut is placed in the chuck, so that the pins 22 of the arms 21 will engage the cocoanut to leave slightly more than one half thereof exposed to the action of the paring knife. The spindle 32, as will be made apparent, is adapted to be reciprocated in the sleeve 28 so that the plate 33 assists in ejecting the nut from the chuck. The chucks on both turrets are preferably all as here described and I prefer to provide three such chucks on each turret or one for each pair of arms 13. The shaft 12 carrying the first turret, is revolved intermittently a third of a revolution at each operation; and in Figure 14 I have shown a modified Geneva movement for this purpose. The shaft 12 carries a disk 36 provided with three gear segments 37 between which are the arcuate locking edges 38; and there are three pins 39 on the disk near the gear segments 37. On the shaft 40 there is a disk 41 provided with gear segments 42 which mesh with the gear segments 37 periodically; and between the segments 42 there are locking surfaces 44 which cooperate with the recesses 38 in the disk 36 to prevent the latter disk from revolving except when the gear segments 42, 37 are in mesh. There are arms 43 on the disk 41 to engage the pins 39 and initiate the turning of the disk 36 to bring the segments 42, 37 into mesh. Each revolution of the shaft 40 causes the shaft 12 to revolve two-thirds of a revolution. The intermittent revolution of the turret 1 causes the three chucks to advance one position at each operation so that they successively pass from position A, which is the first or nut receiving position, to the position B, which is the second or paring position; then to position C which is the discharging or transferring position.

Figure 2:
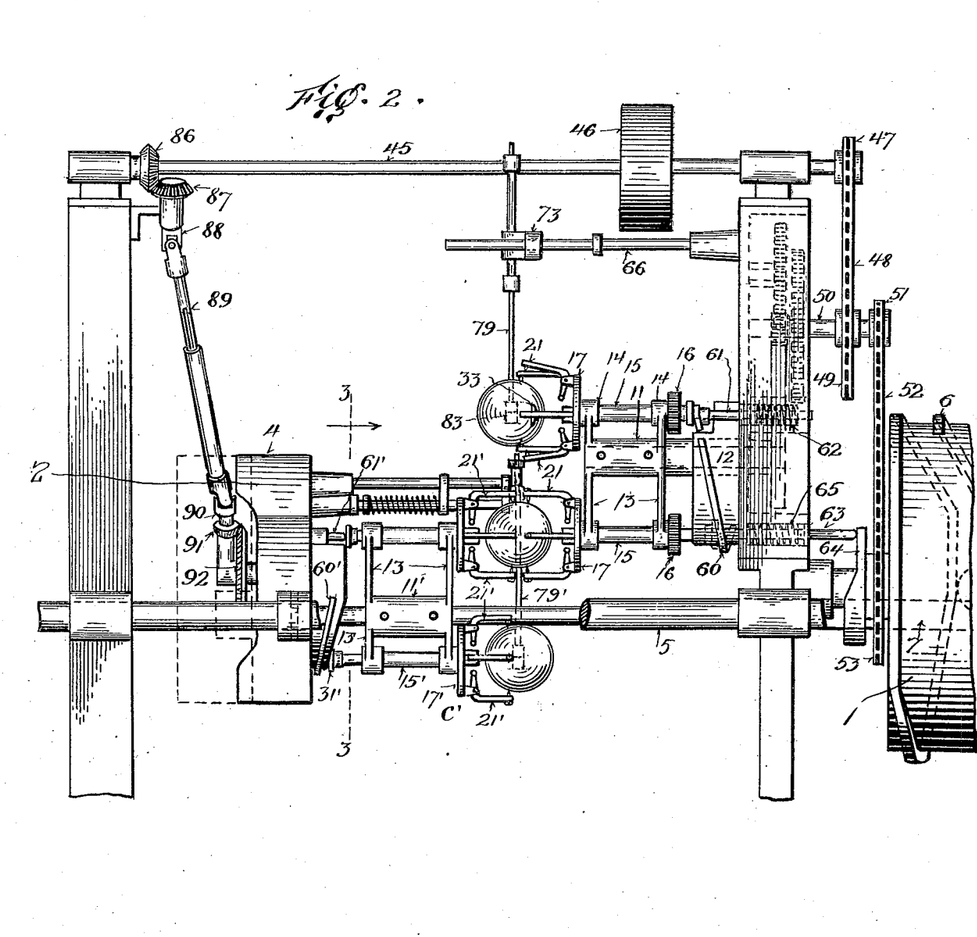
Figure 2 is a side elevation of the machine showing the transfer of a nut from one turret to the other.

The main shaft 45 is driven by any suitable power, as by a belt (not shown) engaging over the pulley 46 (see Figure 2) and the operating force for all mechanisms is distributed from this shaft. At one end of this shaft 45 there is a sprocket 47 and the chain 48 engaging over this sprocket also engages over and drives the sprocket 49 and the shaft 50 on which the latter is mounted. There is a second sprocket 51 on the shaft 50 and from this the power is transmitted by a chain 52 to the sprocket 53 and this drives the shaft 7 on which the cam 6 for shifting the second turret axially is mounted.

Figure 3:
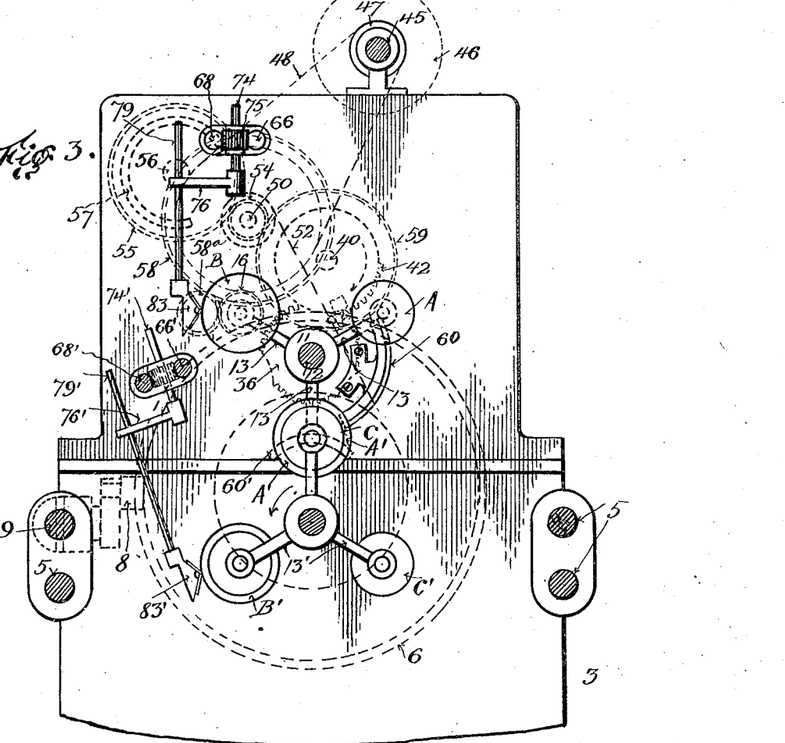
Figure 3 is a sectional view taken on the line 3—3 of Figure 2, the turrets being shown diagrammatically.

The shaft 50 has a small gear 54 which meshes with a gear 55 and thus serves to drive the shaft 56 which is slightly above and to the left of the shaft 50 in Figure 3. The shaft 56 carries a cam 57 which operates the knife carrier, as will be apparent hereinafter.

The shaft 50 also has a large gear 58 and as each chuck comes into position B its gear 16 comes into mesh with the large gear 58 and the latter then operates to revolve the chuck while in position B, so that the paring knife may operate to pare one-half the nut. The chucks are revolved upon their own axes only when in position B, or when the gear 16 is in mesh with the gear 58.

Figures 11, 12, 13, 14, 15, 16, 17:
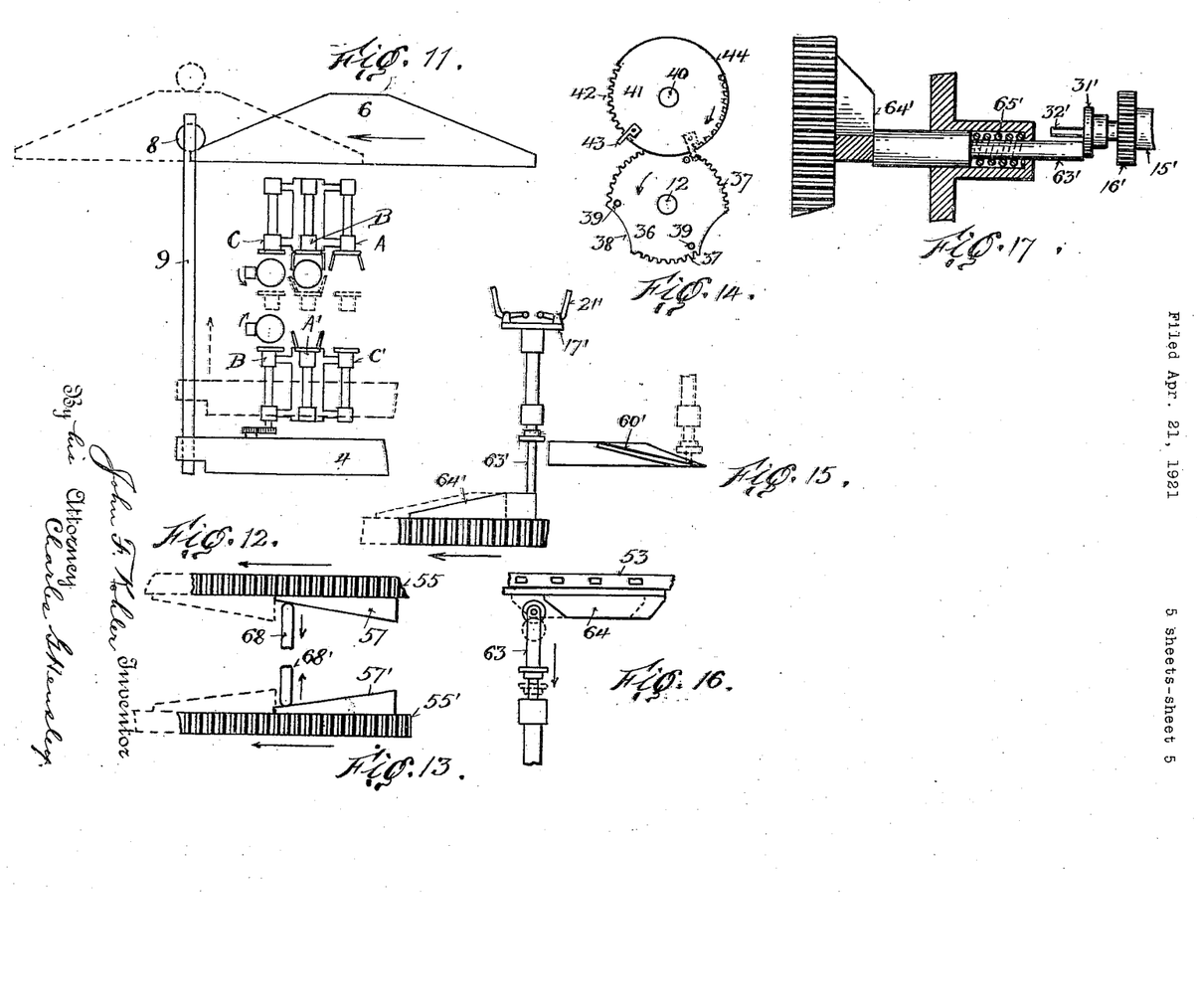
Figure 11 is a diagrammatic view showing the operation of the axially shiftable turret.
Figure 12 is a diagrammatic view illustrating the operation of the paring device for one of the turrets.
Figure 13 is a similar view illustrating the operation of the paring device for the shiftable turret.
Figure 14 is a detail view of a modified Geneva movement for operating the turrets.
Figure 15 is a diagrammatic view illustrating the operation of the means for operating the chuck in the shiftable turret when it takes the nut from the first turret.
Figure 16 shows the means for operating to open the chuck on the first turret to permit the transfer of the nut.
Figure 17 is a sectional view taken on the line 17—17 of Figure 6.

The small gear 54 on the shaft 50 in addition to operating the shaft 56 also operates through the gear 59 to operate the shaft 40, and this is the shaft shown in Figure 14 which carries one of the disks 41 of the Geneva movement for intermittently revolving the first turret.

There is a stationary, arcuate cam 60 (see Figures 2 and 3) with which the head 31 of the sleeve 28 on the chuck device commences to engage just as the chuck leaves position C and moves toward position A. As the chuck device moves from position C to position A, this cam member 60 gradually forces over the inner sleeve 28 of the chuck and this opens the lever arms 21 and prepares them to receive a nut by the time the chuck reaches the position A. Just as the chuck reaches position A, the spindle 32 passes from the cam 60 into contact with the end of a plunger 61 which is pressed by a spring 62 to hold the plate 33 forward to receive the end of the cocoanut against it. If the cocoanut is long it will be pressed against the plate 33 and the latter will be forced inwardly against the resistance of the plunger 61, so that the arms 21 of the chuck will grip the cocoanut almost up to its equator. When the chuck moves from position A toward position B, the member 31 disengages from the plunger 61 and the clamping arms 21 grip the cocoanut under the action of the chuck spring 29. About the same time the spindle 31 disengages from the plunger 61 so that the spindle 32 and the plate 33 are then only subject to the light action of the spring 35.

While the chuck is in position C the cap 31 of the sleeve 28 is in line with a plunger 63 which is pressed away from the cap 31 by a compression spring 65. There is a cam 64 on the shaft 7 and this engages the plunger 63 and forces it to the right in Figure 17, to open the nut clamping arms 21 while the chuck is in position C and just about the time the nut has been gripped by the chuck of the second turret.

Figure 1:
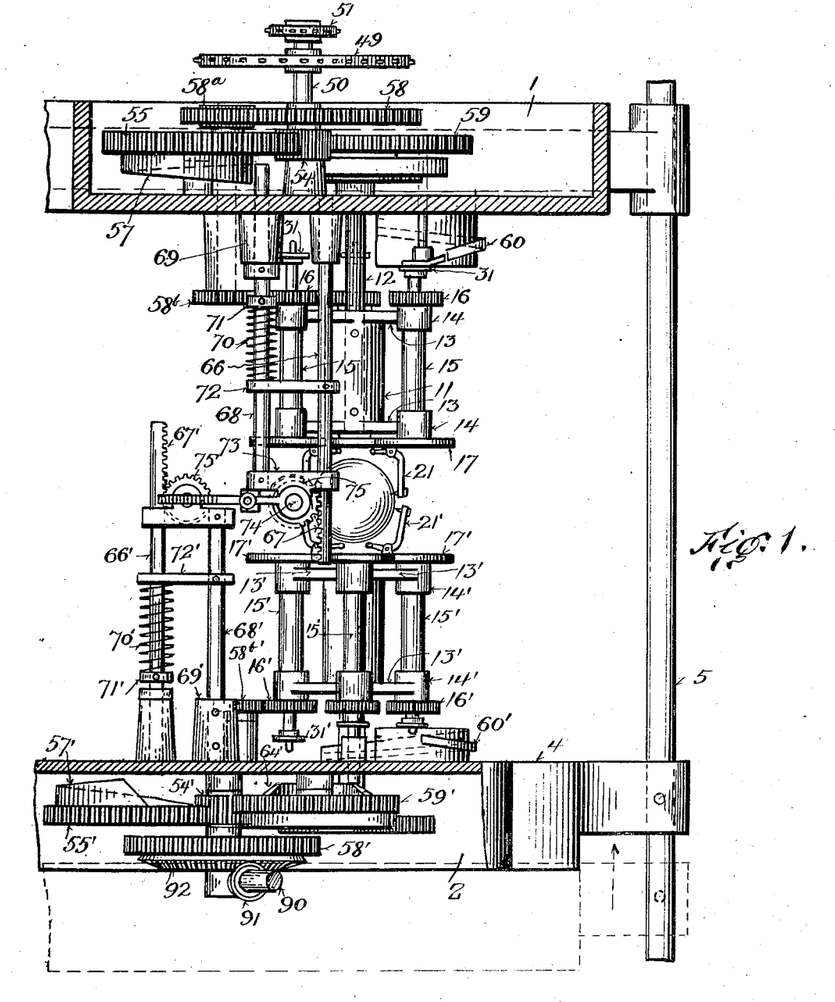
Figure 1 is a plan view illustrating the principal parts of my paring machine, with the turrets in position for the transfer of a nut from one turret to the other, the turret shifting means being omitted.

First paring device. The first half of the nut is pared while the chuck which holds it is in position B. It will be recalled when a chuck is in position B its gear 16 is in mesh with gear 58 on the shaft 50 so that at such times the chuck is revolved and the nut revolves with it, at least one-half the nut being exposed beyond the ends of the arms 21 to the action of the paring device. This paring device is constructed as follows: There is a horizontally positioned bar 66 having rack teeth 67 on its outer, free end. There is a rod 68 sliding in the boss 69 of the frame and it extends parallel with the bar 66; and this rod 68 is periodically reciprocated in one direction by a cam 57 on the shaft 56 (see Figures 1 and 3) and it is moved in the opposite direction by the coiled spring 70 which is compressed between the collar 71 on the rod 68 and the stationary arm 72 fixed to the bar 66. On the outer end of the rod 68 there is fixed a head or block 73 which slides on the bar 66. This head carries a shaft 74 which has a pinion 75 meshing with the rack 67 on the bar 66. As the block 73 moves forward and back with the rod 68 the pinion 75 is acted upon by the stationary rack 67 and this causes the shaft 74 to oscillate. This shaft 74 carries a pair of parallel, spaced arms 76 one of which has a fork 77 forming a bearing for a pin 78. This pin is secured through the arm 79 which carries the knife and the pin 78 is the point of fulcrum for the knife arm 79. The other arm 76 on the shaft 74 has a fork 80 for guiding the free end of the knife arm 79. There is an arm 81 fixed to the knife arm and this is acted upon by an extensible spring 82 having one end engaging the arm 81 and the other end fixed to the fork 80, for the purpose of swinging the knife arm 79 in the direction necessary to hold the knife against the revolving nut.

The knife head 83 carried upon the free end of the knife arm 79 has a guard plate 84 to engage the surface of the cocoanut and limit the depth of cut made by the knife; and it has a knife blade 85 acting to pare the cocoanut.

When the chuck holding the nut moves into position B it commences to revolve and at the same time the knife 85 is pressed by the spring 82 into contact with the cocoanut and the first paring operation starts.

At the commencement of this operation the head 73 is in retracted position and the knife first engages the nut at its equatorial line. The nut makes at least one revolution before the head 73 starts to move, in order that a complete cut may be made around the nut before the knife starts to move toward the pole of the nut. Then the cam 57 commences to act on the rod 68 and it forces the latter and the head 73 outwardly along the bar 66. The rack 67 acts on the pinion 75 to rotate the shaft 74 and this causes the arms 76 and the knife arm 79 to move in arcuate paths, i. e. the arm 79 moves in a semicircle except in so far as its motion is modified by the irregularity of the cocoanut. The block 73 and therefore the pivot 74 moves along the bar 66 a distance approximately one half the length of the average cocoanut, so that the knife swings and it travels longitudinally of the cocoanut held in the chuck. One-half of the cocoanut is thus pared while revolving with the chuck in position B. The turret 1 then revolves 120° and the half-pared nut is carried to position C ready to be transferred to the second turret for the second paring operation.

In most respects the second turret is like the first one except for its position and the parts associated with it are very much the same. I am therefore using the same reference numerals for parts of the second turret as were used in describing the first one, except that for the second the numerals are all prime. The above description may be applied to turret No. 2, if the prime numbers are followed in place of corresponding non-prime numbers above.

The principal difference between the second turret and the first is in its position. The second turret faces in the opposite direction to the first one so that it may take the nuts from the first one. The center of the second turret is below that of the first one, as shown in Figure 3, so that the chucks in positions C and A¹ will be in axial alignment and this is the only time that the chucks of the two turrets align and it is necessary only for the transfer of the nut from one turret to another automatically.

The several gears, cams, plungers, paring device chucks, etc. relating to the second turret are all like those relating to the first one and are numbered the same but the numbers are prime, as above stated.

The second turret device is all mounted on the carriage 4 which reciprocates on the tracks 5 under the action of the cam 6 as herein above described. Power is transmitted from the main shaft 45 by means of a mitre gear 86 operating on a mitre gear 87 on a short shaft 88. The latter is pivotally connected by a telescoping shaft 89 with a short shaft 90. The latter has a mitre gear 91 which meshes with and operates a gear 92 and through these gears the shaft $50^1$ is operated. The shaft $50^1$ corresponds with the shaft 50 and it operates through similar devices to operate the mechanisms associated with the turret No. 2. The telescoping shaft 89 serves to transmit operating force from the shaft 45 to the shaft $50^1$ and it permits the frame 4 and the second turret 2, to be moved back and forth on the tracks 5 at the same time.

With the above exceptions the second turret device and the first one correspond.

Operation: The operator feeds the nuts to the first turret device. The nut is placed in the chuck which stands in position A on the first turret, the pole or apex of the nut being pressed against the plate 33 and the latter is forced over in opposition to the spring plunger 61 so that when the arms 21 close on the nut they will reach almost to the equator thereof.

The nut is momentarily held in this position until the turret starts to rotate and then the spindle 32 is released from the plunger 61 and the sleeve 28 is forced outwardly by its spring 29 and this causes the arms 21 to close on the nut with the pins 22 piercing its surface. The above is the only operation to be performed by the operator.

The chuck having the half projecting nut rotates with the first turret 120° and it comes to rest in position B. The gear 16 is by this time in mesh with the gear 58 and the chuck is then rapidly revolved on its own axis and, of course, the nut revolves with it. When the nut moved with the chuck to position B it came into contact with the paring knife 85 and as the nut commences to revolve, the knife starts at the equator of the nut to cut off a paring. When the nut has made one complete revolution the cam 57 commences to operate on the rod 68 and through the latter it moves the head 73 which carries the knife device. As the head 73 moves outwardly along the bar 66 the pinion 75 is revolved and this causes the shaft 74 to revolve and to advance about half the length of the average cocoanut. The knife 85, while swinging in an arc, is held in contact with the cocoanut by the spring 82. When the knife arrives at the pole of the nut one-half of the latter will have been pared.

Upon the completion of this paring operation the turret rotates another 120° so that the half pared nut and its holding chuck are moved to position C and another nut is moved into position B. The half-pared nut reaches position C about the same time that one of the chucks of the second turret arrives at position $A^1$ with its gripping arms open. While the first turret remains stationary, the carriage 4 and the second turret 2 are moved along the tracks 5 toward the first turret. The open arms $21^1$ of the chuck on turret 2 in position $A^1$ straddle the pared half of the cocoanut and then the head 31 is released by the trigger $63^1$ operated by the cam $64^1$, and the arms $21^1$ of the chuck on turret 2 close on the nut and grip it firmly. The cam 64 now operates on the rod 63 to open the arms 21 of the chuck on turret No. 1 so that the nut may be removed from this turret. The nut has now been gripped by the chuck on turret No. 2 and it has been released by the chuck on turret No. 1, all of which occurs while these chucks are in axial alignment or in positions $A^1$ and C. If the nut was properly fed to turret No. 1, it will be properly positioned in turret No. 2.

The carriage 4 now reverses and moves away from turret No. 1 under the action of the cam 6. When the carriage has fully retracted, the turrets are free to rotate without interference. The second turret, now supplied with the half pared nut transferred to it from turret No. 1 is revolved about its own axis 120° and this brings the chuck having the half pared nut into position $B^1$ and the nut is brought into contact with the second paring device. The gear $16^1$ also comes into mesh with the gear $58^1$ so that this chuck is rapidly revolved. The cam $57^1$ now operates on the rod $68^1$ to reciprocate the head $73^1$ and this causes the arm $79^1$ to swing and to move along one half of the length of the nut and this paring device operates exactly the same as did the first one. It will start to pare the nut at the equator and continue along the unpared half of the nut until it reaches the second pole or apex.

When this paring operation is completed the second turret is revolved on its own axis 120° and this brings the fully pared nut into position $C^1$, which is the final discharge position. While the chuck is moving to position $C^1$, the cam $60^1$ operates on the spindle $32^1$ and head $31^1$ to push over the sleeve $28^1$ of this chuck and this opens the lever arms 21 and the pared nut falls out of the chuck in position $C^1$, into any receptacle placed there to receive it.

The above operations are repeated over and over again. After several nuts have been fed to the first turret the machine will be overlapping in the above functions. That is to say, the operator will always be feeding a nut to the chuck in position A while the turrets are idle; a nut will be in paring position B, having one half pared whenever the turrets are not revolving; a nut will be in the process of being transferred from one turret to the other in positions C and $A^1$; at the same time a nut will be undergoing the second paring operation at position $B^1$; and at the same time a nut will be discharging at position $C^1$ from the second turret. Therefore, the machine may be operated as fast as one paring operation will permit and I have found that this may be about as fast as a skillful operator can feed the nuts to the first turret.

By providing two turrets which take the nut automatically one from the other the nuts may be pared in two stages and it is only necessary to hand feed them to the machine in the first instance. By overlapping the functions so that the machine is simultaneously performing both paring operations, receiving a nut, transferring a nut and discharging a nut, the output will be determined simply by the speed of the operator in feeding the nuts to the first turret.

While I have carefully described in detail the preferred embodiment of my invention I do not wish to be understood as limiting my invention to this particular embodiment but I desire to include all structures coming within the scope of the following claims.

Having described my invention what I claim is:

1. In a device of the character described, the combination of a device for gripping the product to be pared between its equator and one of its poles, a second device for gripping the product between its equator and the opposite pole, means for causing the product to be transferred from one to the other of said gripping devices, a paring knife adapted to pare one half the product while the latter is held by one of said gripping devices and a second paring knife for paring the other half of the product while the latter is held by the other of said gripping devices.

2. In a device of the character described, the combination of a device for gripping the product to be pared between its equator and one of its poles, a second device for gripping the product between its equator and the opposite pole, means for causing the product to be transferred from one to the other of said gripping devices, a paring knife adapted to pare one half the product while the latter is held by one of said gripping devices, a paring knife for paring the other half of the product while the latter is held by the other of said gripping devices, and means for causing said knives to pare from the equator toward the opposite poles of the product.

3. In a device of the character described, the combination of a plurality of revolving turrets, a gripping device on each turret adapted to grip the product to be pared, said gripping devices being arranged to be brought into axial alignment upon the revolution of said turrets, means for revolving said turrets, means for causing the product to be transferred from the gripping device of one turret to the gripping device of the other turret while said gripping devices are in alignment, and means for paring the product while held by said gripping devices.

4. In a device of the character described, the combination of a plurality of revolving turrets, a gripping device on each turret adapted to grip the product to be pared, said gripping devices being arranged to be brought into axial alignment upon the revolution of said turrets, means for causing the product to be transferred from the gripping device of one turret to the gripping device of the other turret while said gripping devices are in alignment, means for intermittently revolving the turrets whereby they will remain stationary while their gripping devices are in alignment, and means for paring the product while held by said gripping devices.

5. In a device of the character described, the combination of a plurality of revolving turrets, a gripping device on each turret adapted to grip the product to be pared, said gripping devices being arranged to be brought into alignment upon the revolution of said turrets, means for causing a relative axial approach of the turrets, means for causing the product to be transferred from the gripping device of one turret to the gripping device of the other turret, while said gripping devices are in alignment, means for intermittently revolving the turrets and means for paring the product while held by said gripping devices.

6. In a device of the character described, the combination of a plurality of revolving turrets, gripping devices on each turret adapted to grip the product to be pared between its equator and its opposite poles, said gripping devices being arranged to be brought into alignment upon the revolution of said turrets, means for causing a relative approach and recession of the turrets while said gripping devices are in alignment, means for causing the product to be transferred from the gripping device of one turret to the gripping device of the other turret while said gripping devices are in alignment, means for revolving the turrets, means for paring one-half the product while held by one of said gripping devices, and means for paring the other half of the product while held by the other of said gripping devices.

7. In a device of the character described the combination of a plurality of revolving turrets, gripping devices on each turret adapted to grip the product to be pared between its equator and its opposite poles, said gripping devices being arranged to be brought into alignment upon the revolution of said turrets, means for causing a relative approach and recession of the turrets while said gripping devices are in alignment, means for causing the product to be transferred from the gripping device of one turret to the gripping device of the other turret while said gripping devices are in alignment, means for revolving the turrets, means for paring one-half the product while held by one of said gripping devices, and means for paring the other half of the product while held by the other of said gripping devices, and means for causing said paring devices to pare from the equator to the respective poles of the product.

8. In a device of the class described, the combination of a plurality of turrets and means for intermittently revolving the same, a plurality of gripping devices on each turret for holding the product to be pared, arranged whereby a gripping device of one turret will align with a gripping device of the other turret in one position of said turrets, means for causing the product to be transferred from a gripping device of one turret to a gripping device of the other turret while said gripping devices are in alignment, devices for paring portions of the product while held by the gripping devices of either turret, and means for revolving said gripping means while in position for the product to be acted upon by said paring devices.

9. In a device of the class described, the combination of a plurality of turrets and means for intermittently revolving the same, a plurality of gripping devices on each turret for holding the product to be pared, arranged whereby the gripping devices of the respective turrets will align in one position of said turrets, means for causing the product to be transferred from a gripping device of one turret to a gripping device of the other turret while said gripping devices are in alignment, a device for paring a product held by a gripping device of one turret and a paring device for simultaneously paring a portion of a product held by a gripping device of the other turret.

10. In a device of the class described, the combination of a revolvable turret and at least three gripping devices for holding the product to be pared, spaced radially around said turret, means for intermittently revolving said turret, means for holding open a gripping device in one position of rest of the turret, means for paring a portion of the product in a gripping device at another position of rest, means for releasing the product from a gripping device in another position of rest, a second turret having at least three gripping devices adapted to successively align with the gripping devices of said first turret, means for intermittently revolving said second turret, means for closing a gripping device of said second turret while aligned with a gripping device of said first turret, means for paring a portion of the product held in a gripping device of the second turret after it has shifted from its receiving position, and means for opening a gripping device of the second turret after it has shifted from the paring position, to discharge the product.

Signed at the city, county and State of New York, on the 13th day of April, 1921.

JOHN F. KOHLER.